(12) United States Patent
Wan et al.

(10) Patent No.: US 11,601,900 B2
(45) Date of Patent: Mar. 7, 2023

(54) COMMUNICATION METHOD AND APPARATUS FOR TIME SYNCHRONIZATION OF TERMINAL DEVICES

(71) Applicant: Huawei Technologies Co., Ltd., Shenzhen (CN)

(72) Inventors: Guangnan Wan, Shanghai (CN); Feng Yu, Beijing (CN); Bo Lin, Beijing (CN); Guangwei Yu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 93 days.

(21) Appl. No.: 17/062,267

(22) Filed: Oct. 2, 2020

(65) Prior Publication Data
US 2021/0037490 A1  Feb. 4, 2021

Related U.S. Application Data

(63) Continuation of application No. PCT/CN2018/082007, filed on Apr. 4, 2018.

(51) Int. Cl.
*H04W 56/00* (2009.01)
*H04W 68/00* (2009.01)

(52) U.S. Cl.
CPC ....... *H04W 56/001* (2013.01); *H04W 56/005* (2013.01); *H04W 68/005* (2013.01)

(58) Field of Classification Search
None
See application file for complete search history.

(56) References Cited

U.S. PATENT DOCUMENTS

| | | | | |
|---|---|---|---|---|
| 6,236,665 B1 * | 5/2001 | Kanzaki | ............... | H04J 3/0688 370/503 |
| 2009/0052430 A1 * | 2/2009 | Gorokhov | ............ | H04B 7/2693 370/350 |

(Continued)

FOREIGN PATENT DOCUMENTS

| CN | 1712983 A | 12/2005 |
|---|---|---|
| CN | 101247168 A | 8/2008 |

(Continued)

OTHER PUBLICATIONS

"UE Time Synchronization," 3GPP TSG RAN WG2 #101, R2-1802721, Athens, Greece, Total 3 pages, 3rd Generation Partnership Project, Valbonne, France (Feb. 26-Mar. 2, 2018).

(Continued)

*Primary Examiner* — Saad Khawar
(74) *Attorney, Agent, or Firm* — Leydig. Voit & Mayer, Ltd.

(57) ABSTRACT

A communication method and a communications apparatus are provided. The communication method includes: sending, by a terminal device, a first indication message, where the first indication message is used to indicate a first time type and/or a first time precision, or the first indication message is used to indicate an access network device to send time information to the terminal device; receiving, by the terminal device, the time information; and synchronizing, by the terminal device, a time of the terminal device based on the time information. Correspondingly, a communications apparatus is further provided. According to the embodiments of this application, the terminal device can obtain, based on requirements of different application scenarios, a time type and/or time precision preferred by the terminal device.

12 Claims, 9 Drawing Sheets

(56) References Cited

U.S. PATENT DOCUMENTS

| | | | |
|---|---|---|---|
| 2009/0077247 A1 | 3/2009 | Bouazizi et al. | |
| 2014/0376533 A1 | 12/2014 | Tohzaka et al. | |
| 2015/0296544 A1 | 10/2015 | Kim et al. | |
| 2016/0345279 A1* | 11/2016 | Gunnarsson | H04W 56/002 |
| 2017/0374644 A1 | 12/2017 | Ryu et al. | |
| 2018/0205476 A1* | 7/2018 | Wang | H04L 7/04 |

FOREIGN PATENT DOCUMENTS

| | | |
|---|---|---|
| CN | 102378112 A | 3/2012 |
| CN | 103796296 A | 5/2014 |
| CN | 105682215 A | 6/2016 |
| CN | 111316719 A | 6/2020 |
| EP | 1143640 A1 | 10/2001 |
| EP | 1708521 A1 | 10/2006 |
| EP | 3703437 A1 | 9/2020 |
| WO | 2016078310 A1 | 5/2016 |
| WO | 2019095575 A1 | 5/2019 |

OTHER PUBLICATIONS

"3rd Generation Partnership Project; Technical Specification Group Radio Access Network; Evolved Universal Terrestrial Radio Access (E-UTRA); User Equipment (UE) radio access capabilities (Release 15)," 3GPP TS 36.306 V15.0.0, pp. 1-86, 3rd Generation Partnership Project, Valbonne, France (Mar. 2018).

"3rd Generation Partnership Project; Technical Specification Group Radio Access Network; Evolved Universal Terrestrial Radio Access (E-UTRA); Radio Resource Control (RRC); Protocol specification (Release 15)," 3GPP TS 36.331 V15.1.0, pp. 1-786, 3rd Generation Partnership Project, Valbonne, France (Mar. 2018).

"PRACH for LC-MTC," 3GPP TSG RAN WG1 Meeting #80bis, R1-151234, Belgrade, Serbia, Total 4 pages, 3rd Generation Partnership Project, Valbonne, France (Apr. 20-24, 2015).

Zte et al., "WF on NB-RS for NB-IoT," 3GPP TSG RAN WG1 #84 meeting, R1-161234, St. Julian, Malta, Total 3 pages, 3rd Generation Partnership Project, Valbonne, France (Feb. 15-19, 2016).

EP/18913288.9, Office Action, dated Sep. 6, 2022.

* cited by examiner

COMMUNICATION METHOD AND APPARATUS FOR TIME SYNCHRONIZATION OF TERMINAL DEVICES

CROSS-REFERENCE TO RELATED APPLICATIONS

This application is a continuation of International Application No. PCT/CN2018/082007, filed on Apr. 4, 2018, the disclosure of which is hereby incorporated by reference in its entirety.

TECHNICAL FIELD

This application relates to the field of communications technologies, and in particular, to a communication method and a communications apparatus.

BACKGROUND

As the automation level in the industrial manufacturing field continuously improves, industrial devices undertake more important production tasks. The industrial devices are becoming more intelligent, networked, and open. In many scenarios, a plurality of industrial devices need to collaborate to complete a production task highly precisely within predetermined duration as commanded. Therefore, in addition to necessary communication, high-precision clock synchronization needs to be maintained between the industrial devices. In an existing industrial scenario, industrial devices usually exchange information in a wired manner. However, with development of wireless communications systems, wireless communication performance becomes better, and can meet a communication requirement of an ultra-reliable low-latency (URLLC) service type in an industrial control scenario, and replacing wired communication with wireless communication will be a development trend in the future. Similarly, the clock synchronization technology will be wireless.

Generally, a terminal device synchronizes a time of the terminal device by using a time broadcast by a base station. For example, the terminal device may obtain the time by using a system information block (SIB) 16. However, this time synchronization manner cannot meet more time requirements of the terminal device.

Therefore, how to better meet more time requirements of the terminal device is an urgent problem to be resolved.

SUMMARY

Embodiments of this application disclose a communication method and a communications apparatus, so that a terminal device can obtain, based on requirements of different application scenarios, a time type and/or time precision preferred by the terminal device, thereby improving time synchronization efficiency of the terminal device.

According to a first aspect, an embodiment of this application discloses a communication method. The method includes:

sending, by a terminal device, a first indication message, where the first indication message is used to indicate a first time type and/or a first time precision, or the first message is used to indicate an access network device to send time information to the terminal device;

receiving, by the terminal device, the time information; and synchronizing, by the terminal device, a time of the terminal device based on the time information.

In this embodiment of this application, the first time type is one or at least two time types supported by the terminal device; and the first time precision is a lowest time precision supported by the terminal device, or the first time precision is a lowest time precision and a highest time precision that are supported by the terminal device, or the first time precision is a time precision between a lowest time precision and a highest time precision that are supported by the terminal device. Alternatively, the terminal device may activate, by using the first indication message, the access network device to send the time information to the terminal device, to meet a requirement of the terminal device for the target time in a current application scenario. This effectively avoids a problem that a time type received by the terminal device is single or time precision cannot meet a scenario requirement of the terminal device, and improves time synchronization efficiency of the terminal device.

In a possible implementation, when the first time type is at least two time types supported by the terminal device, the first indication message includes a priority of the first time type, where the priority of the first time type is used to indicate that the access network device determines a target time type based on the priority of the first time type, the target time type is a time type of a target time, and the target time is a time in the time information.

In this embodiment of this application, when there are at least two first time types, the priority of the first time type is indicated to the access network device, so that the access network device can clearly learn of a time type that is most urgently needed (or most preferred prefer) by the terminal device, thereby improving time type delivery efficiency of the access network device.

In a possible implementation, when the first indication message is used to indicate the access network device to send the time information to the terminal device, before the receiving, by the terminal device, the time information, the method further includes:

receiving, by the terminal device, a second indication message sent by the access network device, where the second indication message is used to indicate the terminal device to send the first time type and/or the first time precision to the access network device; and sending, by the terminal device, a second feedback message to the access network device, where the second feedback message is used to indicate the first time type and/or the first time precision.

By implementing this embodiment of this application, when the access network device does not determine a time type and/or time precision that are/is most needed by the terminal device, the access network device can clearly learn, by receiving the second feedback message from the terminal device, of the time type and/or the time precision that are/is most urgently needed by the terminal device, thereby improving information exchange efficiency.

In a possible implementation, before the receiving, by the terminal device, the time information, the method further includes:

receiving, by the terminal device, a broadcast message from the access network device, where the broadcast message is used to broadcast a second time type and/or a second time precision, the second time type is a time type supported by the access network device, and the second time precision is a time precision supported by the access network device.

In this embodiment of this application, the access network device may pre-broadcast a time type and/or time precision that are/is supported by the access network device, so that when the terminal device needs the access network device to deliver the target time, the terminal device may determine, based on the second time type and/or the second time precision, the time type and/or the time precision that the terminal device most needs to obtain from the access network device, to reduce a quantity of times of unicast interaction between the terminal device and the access network device, and avoid wasting a communications resource. Alternatively, the access network device broadcasts a time type and/or a time precision that are/is supported by the access network device, so that the terminal device can learn of a time type and/or time precision of the target time in the time information before receiving the time information. The second time type may be one time type supported by the access network device or at least two time types supported by the access network device. The second time precision may be a highest time precision supported by the access network device, or may be at least two time precisions supported by the access network device.

In a possible implementation, the sending, by a terminal device, a first indication message includes:

sending, by the terminal device, the first indication message to the access network device by using radio resource control (RRC) signaling or a medium access control control element (MAC CE); or sending, by the terminal device, the first indication message to a core network device, where the first indication message is used to indicate the core network device to send the first indication message to the access network device.

In this embodiment of this application, the terminal device may directly send the first indication message to the access network device, or may indirectly send the first indication message to the access network device via the core network device.

In a possible implementation, after the sending, by a terminal device, a first indication message, and before the receiving, by the terminal device, the time information, the method further includes:

receiving, by the terminal device, a first feedback message sent by the access network device, where the first feedback message is used to indicate whether the access network device processes the first indication message, or the first feedback message is used to indicate the target time type and/or a target time precision.

In this embodiment of this application, when the first indication message is used to indicate the first time type and the first time type is one time type, after the terminal device sends the first indication message, the terminal device can clearly learn, by receiving the first feedback message from the access network device, whether the access network device processes the first indication message. When the first time type is at least two time types, the first indication message may be used to indicate the target time type. Alternatively, when the first indication message is used to indicate the first time precision and the first time precision is the time precision supported by the access network device, the terminal device can learn, by receiving the first feedback message, whether the access network device processes the first indication message. When the first indication message is used to indicate the access network device to send the time information to the terminal device, the first feedback message may be used to indicate the target time type and/or the target time precision. In other words, the access network device may determine content in the first feedback message based on content included in the first indication message.

In a possible implementation, after the synchronizing, by the terminal device, a time of the terminal device based on the time information, the method further includes:

sending, by the terminal device, a third indication message to the access network device, where the third indication message is used to indicate to deactivate the access network device to send the time information to the terminal device.

In this embodiment of this application, when the terminal device does not need the access network device to send the time information in unicast mode, the terminal device may send the third indication message to the access network device, thereby saving a resource.

In a possible implementation, the time information includes the target time; or the time information includes the target time, and the time information further includes the target time type and/or the target time precision.

In this embodiment of this application, the access network device may determine, based on a result of interaction with the terminal device, content included in the time information, to avoid repeated sending and a resource waste. Alternatively, the access network device may determine, based on reliability of the time information, content included in the time information.

According to a second aspect, an embodiment of this application further discloses a communication method. The method includes:

receiving, by an access network device, a first indication message, where the first indication message is used to indicate a first time type and/or a first time precision, or the first indication message is used to indicate the access network device to send time information to a terminal device;

sending, by the access network device, the time information to the terminal device, where the time information is used to indicate the terminal device to synchronize a time of the terminal device.

In this embodiment of this application, the terminal device sends the first indication message to enable the access network device to send the time information to the terminal device.

In a possible implementation, when the first time type is at least two time types supported by the terminal device, the first indication message includes a priority of the first time type, where the priority of the first time type is used to indicate that the access network device determines a target time type based on the priority of the first time type, the target time type is a time type of a target time, and the target time is a time in the time information.

In a possible implementation, when the first indication message is used to indicate the access network device to send the time information to the terminal device, before the sending, by the access network device, the time information to the terminal device, the method further includes:

sending, by the access network device, a second indication message to the terminal device, where the second indication message is used to indicate the terminal device to send the first time type and/or the first time precision to the access network device; and receiving, by the access network device, a second feedback message sent by the terminal device, where the second feedback message is used to indicate the first time type and/or the first time precision.

In a possible implementation, before the sending, by the access network device, the time information to the terminal device, the method further includes:

sending, by the access network device, a broadcast message to the terminal device, where the broadcast message is used to broadcast a second time type and/or a second time precision, the second time type is a time type supported by the access network device, and the second time precision is a time precision supported by the access network device.

In a possible implementation, the receiving, by an access network device, a first indication message includes:

receiving, by the access network device by using radio resource control (RRC) signaling or a medium access control control element (MAC CE), the first indication message sent by the terminal device; or receiving, by the access network device, the first indication message sent by a core network device, where the first indication message is a message sent by the terminal device to the core network device.

In a possible implementation, after the receiving, by an access network device, a first indication message, and before the sending, by the access network device, the time information to the terminal device, the method further includes:

sending, by the access network device, a first feedback message to the terminal device, where the first feedback message is used to indicate whether the access network device processes the first indication message, or the first feedback message is used to indicate the target time type and/or a target time precision.

In a possible implementation, after the sending, by the access network device, the time information to the terminal device, the method further includes:

receiving, by the access network device, a third indication message sent by the terminal device, where the third indication message is used to indicate to deactivate the access network device to send the time information to the terminal device.

In a possible implementation, the time information includes the target time; or the time information includes the target time, and the time information further includes the target time type and/or the target time precision.

According to a third aspect, an embodiment of this application further provides a communication method. The method includes:

sending, by a terminal device, a first indication message, where the first indication message is used to indicate a first time type and/or a first time precision; the first time type is one or at least two time types supported by the terminal device; and the first time precision is a lowest time precision supported by the terminal device, or the first time precision is a lowest time precision and a highest time precision that are supported by the terminal device, or the first time precision is a time precision between a lowest time precision and a highest time precision that are supported by the terminal device;

receiving, by the terminal device, the time information; and synchronizing, by the terminal device, a time of the terminal device based on the time information.

In a possible implementation, when the first time type is at least two time types supported by the terminal device, the first indication message includes a priority of the first time type, where the priority of the first time type is used to indicate that the access network device determines a target time type based on the priority of the first time type, the target time type is a time type of a target time, and the target time is a time in the time information.

In this embodiment of this application, the terminal device indicates a time type preferred by the terminal device, so that efficiency of determining the target time type by the access network device can be improved.

In a possible implementation, before the sending, by a terminal device, a first indication message, the method further includes:

receiving, by the terminal device, a broadcast message from the access network device, where the broadcast message is used to broadcast a second time type and/or a second time precision, the second time type is a time type supported by the access network device, and the second time precision is a time precision supported by the access network device.

In this embodiment of this application, the access network device sends the broadcast message, so that the terminal device can clearly learn of a time type and/or a time precision that are/is supported by the access network device. Therefore, the terminal device can learn whether the second time type includes a time type needed by the terminal device and whether the second time precision includes a time precision needed by the terminal device. In this way, feasibility of sending the first indication message by the terminal device is improved. If the second time type does not include the time type needed by the terminal device, the terminal device may not send the first indication message.

In a possible implementation, the sending, by a terminal device, a first indication message includes:

sending, by the terminal device, the first indication message to the access network device by using radio resource control (RRC) signaling or a medium access control control element (MAC CE); or sending, by the terminal device, the first indication message to a core network device, where the first indication message is used to indicate the core network device to send the first indication message to the access network device.

In a possible implementation, after the sending, by a terminal device, a first indication message, and before the receiving, by the terminal device, the time information, the method further includes:

receiving, by the terminal device, a first feedback message sent by the access network device, where the first feedback message is used to indicate whether the access network device processes the first indication message, or the first feedback message is used to indicate the target time type and/or a target time precision.

In this embodiment of this application, the first feedback message may be an acknowledgment (ACK) message or a negative acknowledgment (NACK) message.

Alternatively, the first feedback message may further carry the target time type and/or the target time precision.

In a possible implementation, after the synchronizing, by the terminal device, a time of the terminal device based on the time information, the method further includes:

sending, by the terminal device, a third indication message to the access network device, where the third indication message is used to indicate to deactivate the access network device to send the time information to the terminal device.

In this embodiment of this application, when the terminal device does not need the access network device to deliver the time information in unicast mode, the terminal device may send the third indication message to the access network device.

In a possible implementation, the time information includes the target time; or the time information includes the target time, and the time information further includes the target time type and/or the target time precision.

In this embodiment of this application, when the terminal device and the access network device determine the time type and/or the time precision through negotiation, the time information may include only the target time. However, when the terminal device and the access network device do not determine the time type and/or the time precision through negotiation, the time information may further include the target time type and/or the target time precision.

According to a fourth aspect, an embodiment of this application further provides a communication method. The method includes:

receiving, by an access network device, a first indication message, where the first indication message is used to indicate a first time type and/or a first time precision, the first time type is one or at least two time types supported by a terminal device, and the first time precision is one or at least two time precisions supported by the terminal device; and sending, by the access network device, time information to the terminal device, where the time information is used to indicate the terminal device to synchronize a time of the terminal device.

In a possible implementation, when the first time type is at least two time types supported by the terminal device, the first indication message includes a priority of the first time type, where the priority of the first time type is used to indicate that the access network device determines a target time type based on the priority of the first time type, the target time type is a time type of a target time, and the target time is a time in the time information.

In a possible implementation, before the sending, by the access network device, the time information to the terminal device, the method further includes:

sending, by the access network device, a broadcast message to the terminal device, where the broadcast message is used to broadcast a second time type and/or a second time precision, the second time type is a time type supported by the access network device, and the second time precision is a time precision supported by the access network device.

In a possible implementation, the receiving, by an access network device, a first indication message includes:

receiving, by the access network device by using radio resource control (RRC) signaling or a medium access control control element (MAC CE), the first indication message sent by the terminal device; or receiving, by the access network device, the first indication message sent by a core network device, where the first indication message is a message sent by the terminal device to the core network device.

In a possible implementation, after the receiving, by an access network device, a first indication message, and before the sending, by the access network device, the time information to the terminal device, the method further includes:

sending, by the access network device, a first feedback message to the terminal device, where the first feedback message is used to indicate whether the access network device processes the first indication message, or the first feedback message is used to indicate the target time type and/or a target time precision.

In a possible implementation, after the sending, by the access network device, the time information to the terminal device, the method further includes:

receiving, by the access network device, a third indication message sent by the terminal device, where the third indication message is used to indicate to deactivate the access network device to send the time information to the terminal device.

In a possible implementation, the time information includes the target time; or the time information includes the target time, and the time information further includes the target time type and/or the target time precision.

According to a fifth aspect, an embodiment of this application further provides a communication method. The method includes:

sending, by a terminal device, a first indication message, where the first indication message is used to indicate an access network device to send time information to the terminal device;

receiving, by the terminal device, the time information; and synchronizing, by the terminal device, a time of the terminal device based on the time information.

In this embodiment of this application, the first indication message may be used to activate the access network device to deliver the time information to the terminal device in unicast mode, to meet a current scenario requirement of the terminal device.

In a possible implementation, before the receiving, by the terminal device, the time information, the method further includes:

receiving, by the terminal device, a second indication message sent by the access network device, where the second indication message is used to indicate the terminal device to send a first time type and/or a first time precision to the access network device; and sending, by the terminal device, a second feedback message to the access network device, where the second feedback message is used to indicate the first time type and/or the first time precision.

In this embodiment of this application, because the first indication message does not carry a time type and/or a time precision that are/is needed or supported by the terminal device, and the access network device cannot clearly learn of the time type and/or the time precision that are/is needed by the terminal device, the access network device sends the second indication message to the terminal device, so that the access network device can determine a target time type and/or a target time precision.

In a possible implementation, before the receiving, by the terminal device, the time information, the method further includes:

receiving, by the terminal device, a broadcast message from the access network device, where the broadcast message is used to broadcast a second time type and/or a second time precision, the second time type is a time type supported by the access network device, and the second time precision is a time precision supported by the access network device.

In this embodiment of this application, the broadcast message may be broadcast before or after the terminal device sends the first indication message. This is not limited in this embodiment of this application. The access network device broadcasts the second time type and/or the second time precision, so that the terminal device learns of a time type and/or a time precision of a target time in the time information delivered by the access network device.

In a possible implementation, the sending, by a terminal device, a first indication message includes:

sending, by the terminal device, the first indication message to the access network device by using radio resource control (RRC) signaling or a medium access control control element (MAC CE); or sending, by the terminal device, the first indication message to a core network device, where the first indication message is used to indicate the core network device to send the first indication message to the access network device.

In a possible implementation, after the sending, by a terminal device, a first indication message, and before the receiving, by the terminal device, the time information, the method further includes:

receiving, by the terminal device, a first feedback message sent by the access network device, where the first feedback message is used to indicate whether the access network device processes the first indication message, or the first feedback message is used to indicate the target time type and/or a target time precision.

In a possible implementation, after the synchronizing, by the terminal device, a time of the terminal device based on the time information, the method further includes:

sending, by the terminal device, a third indication message to the access network device, where the third indication message is used to indicate to deactivate the access network device to send the time information to the terminal device.

In a possible implementation, the time information includes the target time; or the time information includes the target time, and the time information further includes the target time type and/or the target time precision.

According to a sixth aspect, an embodiment of this application further provides a communication method. The method includes:

receiving, by an access network device, a first indication message, where the first indication message is used to indicate the access network device to send time information to a terminal device; and sending, by the access network device, the time information to the terminal device, where the time information is used to indicate the terminal device to synchronize a time of the terminal device.

In a possible implementation, before the sending, by the access network device, the time information to the terminal device, the method further includes:

sending, by the access network device, a second indication message to the terminal device, where the second indication message is used to indicate the terminal device to send a first time type and/or a first time precision to the access network device; and receiving, by the access network device, a second feedback message sent by the terminal device, where the second feedback message is used to indicate the first time type and/or the first time precision.

In a possible implementation, before the sending, by the access network device, the time information to the terminal device, the method further includes:

sending, by the access network device, a broadcast message to the terminal device, where the broadcast message is used to broadcast a second time type and/or a second time precision, the second time type is a time type supported by the access network device, and the second time precision is a time precision supported by the access network device.

In a possible implementation, the receiving, by an access network device, a first indication message includes:

receiving, by the access network device by using radio resource control (RRC) signaling or a medium access control control element (MAC CE), the first indication message sent by the terminal device; or receiving, by the access network device, the first indication message sent by a core network device, where the first indication message is a message sent by the terminal device to the core network device.

In a possible implementation, after the receiving, by an access network device, a first indication message, and before the sending, by the access network device, the time information to the terminal device, the method further includes:

sending, by the access network device, a first feedback message to the terminal device, where the first feedback message is used to indicate whether the access network device processes the first indication message, or the first feedback message is used to indicate the target time type and/or a target time precision.

In a possible implementation, after the sending, by the access network device, the time information to the terminal device, the method further includes:

receiving, by the access network device, a third indication message sent by the terminal device, where the third indication message is used to indicate to deactivate the access network device to send the time information to the terminal device.

In a possible implementation, the time information includes the target time; or the time information includes the target time, and the time information further includes the target time type and/or the target time precision.

According to a seventh aspect, an embodiment of this application provides a communications apparatus. The apparatus includes:

a sending unit, configured to send a first indication message, where the first indication message is used to indicate a first time type and/or a first time precision, or the first indication message is used to indicate an access network device to send time information to a terminal device;

a receiving unit, configured to receive the time information; and a synchronization unit, configured to synchronize a time of the terminal device based on the time information.

In a possible implementation, when the first time type is at least two time types supported by the terminal device, the first indication message includes a priority of the first time type, where the priority of the first time type is used to indicate that the access network device determines a target time type based on the priority of the first time type, the target time type is a time type of a target time, and the target time is a time in the time information.

In a possible implementation, when the first indication message is used to indicate the access network device to send the time information to the terminal device, the receiving unit is further configured to receive a second indication message sent by the access network device, where the second indication message is used to indicate the terminal device to send the first time type and/or the first time precision to the access network device; and the sending unit is further configured to send a second feedback message to the access network device, where the second feedback message is used to indicate the first time type and/or the first time precision.

In a possible implementation, the receiving unit is further configured to receive a broadcast message from the access network device, where the broadcast message is used to broadcast a second time type and/or a second time precision, the second time type is a time type supported by the access network device, and the second time precision is a time precision supported by the access network device.

In a possible implementation, the sending unit is configured to send the first indication message to the access network device by using radio resource control (RRC) signaling or a medium access control control element (MAC CE); or the sending unit is configured to send the first indication message to a core network device, where the first indication message is used to indicate the core network device to send the first indication message to the access network device.

In a possible implementation, the receiving unit is further configured to receive a first feedback message sent by the access network device, where the first feedback message is used to indicate whether the access network device processes the first indication message, or the first feedback message is used to indicate the target time type and/or a target time precision.

In a possible implementation, the sending unit is further configured to send a third indication message to the access network device, where the third indication message is used to indicate to deactivate the access network device to send the time information to the terminal device.

The time information includes the target time; or the time information includes the target time, and the time information further includes the target time type and/or the target time precision.

According to an eighth aspect, an embodiment of this application further provides a communications apparatus. The apparatus includes:

a receiving unit, configured to receive a first indication message, where the first indication message is used to indicate a first time type and/or a first time precision, or the first indication message is used to indicate an access network device to send time information to a terminal device; and a sending unit, configured to send the time information to the terminal device, where the time information is used to indicate the terminal device to synchronize a time of the terminal device.

In a possible implementation, when the first time type is at least two time types supported by the terminal device, the first indication message includes a priority of the first time type, where the priority of the first time type is used to indicate that the access network device determines a target time type based on the priority of the first time type, the target time type is a time type of a target time, and the target time is a time in the time information.

In a possible implementation, when the first indication message is used to indicate the access network device to send the time information to the terminal device, the sending unit is further configured to send a second indication message to the terminal device, where the second indication message is used to indicate the terminal device to send the first time type and/or the first time precision to the access network device; and the receiving unit is further configured to receive a second feedback message sent by the terminal device, where the second feedback message is used to indicate the first time type and/or the first time precision.

In a possible implementation, the sending unit is further configured to send a broadcast message to the terminal device, where the broadcast message is used to broadcast a second time type and/or a second time precision, the second time type is a time type supported by the access network device, and the second time precision is a time precision supported by the access network device.

In a possible implementation, the receiving unit is configured to receive, by using radio resource control RRC signaling or a medium access control control element (MAC CE), the first indication message sent by the terminal device; or the receiving unit is configured to receive the first indication message sent by a core network device, where the first indication message is a message sent by the terminal device to the core network device.

In a possible implementation, the sending unit is further configured to send a first feedback message to the terminal device, where the first feedback message is used to indicate whether the access network device processes the first indication message, or the first feedback message is used to indicate the target time type and/or a target time precision.

In a possible implementation, the receiving unit is further configured to receive a third indication message sent by the terminal device, where the third indication message is used to indicate to deactivate the access network device to send the time information to the terminal device.

In a possible implementation, the time information includes the target time; or the time information includes the target time, and the time information further includes the target time type and/or the target time precision.

According to a ninth aspect, an embodiment of this application further provides a communications apparatus, to implement the communication method in the first aspect, the third aspect, or the fifth aspect. For example, the communications apparatus may be a chip such as a baseband chip or a communications chip, or the communications apparatus may be a device such as a terminal device. The communications apparatus may implement the foregoing method by using software or hardware, or by hardware executing corresponding software.

In a possible implementation, a structure of the communications apparatus includes a processor, a memory, and a transceiver. The processor, the memory, and the transceiver are interconnected by using a line. The transceiver may be configured to send a first indication message. The transceiver may further be configured to receive time information. The memory is configured to store a program instruction. When the program instruction is executed by the processor, the processor is enabled to synchronize a time of the communications apparatus based on the time information. In other words, the processor may be configured to support the communications apparatus in performing a corresponding function in the foregoing communication method. The transceiver is configured to support communication between the communications apparatus and another network element.

In a possible implementation, the memory may be a physically independent unit, or may be integrated with the processor.

In a possible implementation, the communications apparatus may include a synchronization unit, a receiving unit, and a sending unit. The synchronization unit is configured to implement the synchronization function in the foregoing communication method. The receiving unit and the sending unit are respectively configured to implement the receiving function and the sending function in the foregoing communication method. For example, the sending unit is configured to send a first indication message, the receiving unit is configured to receive time information, and the synchronizing unit is configured to synchronize a time of the terminal device based on the time information.

When the communications apparatus is a chip, the receiving unit may be an input unit, for example, an input circuit or a communications interface; and the sending unit may be an output unit, for example, an output circuit or a communications interface. When the communications apparatus is a terminal device, the receiving unit may be a receiver (which may also be referred to as a receiving machine), and the sending unit may be a transmitter (which may also be referred to as a transmitting machine).

According to a tenth aspect, an embodiment of this application further provides a communications apparatus, to implement the communication method in the second aspect, the fourth aspect, or the sixth aspect. For example, the communications apparatus may be a chip such as a baseband chip or a communications chip, or the communications apparatus may be a device such as an access network device. The communications apparatus may implement the foregoing method by using software or hardware, or by hardware executing corresponding software.

In a possible implementation, a structure of the communications apparatus includes a processor, a memory, and a transceiver. The processor, the memory, and the transceiver are interconnected by using a line. The transceiver may be configured to receive a first indication message, and may further be configured to send time information and the like to a terminal device. The transceiver may be configured to support communication between the communications apparatus and another network element. The memory may be configured to store a program. The processor may be configured to support the communications apparatus in performing another communication function.

In a possible implementation, the memory may be a physically independent unit, or may be integrated with the processor.

In a possible implementation, the communications apparatus may include a receiving unit and a sending unit. The receiving unit and the sending unit are respectively configured to implement the receiving function and the sending function in the foregoing communication method. For example, the receiving unit is configured to receive a first indication message, and the sending unit is configured to send time information to a terminal device.

When the communications apparatus is a chip, the receiving unit may be an input unit, for example, an input circuit or a communications interface; and the sending unit may be an output unit, for example, an output circuit or a communications interface. When the communications apparatus is an access network device, the receiving unit may be a receiver (which may also be referred to as a receiving machine), and the sending unit may be a transmitter (which may also be referred to as a transmitting machine).

According to an eleventh aspect, an embodiment of this application provides a computer-readable storage medium. The computer-readable storage medium stores an instruction, and when the instruction is run on a computer, the computer is enabled to perform the method according to any one of the foregoing aspects.

According to a twelfth aspect, an embodiment of this application provides a computer program product including an instruction. When the computer program product runs on a computer, the computer is enabled to perform the method according to any one of the foregoing aspects.

DESCRIPTION OF EMBODIMENTS

The following describes embodiments of this application with reference to the accompanying drawings in the embodiments of this application.

The following describes technical terms in the embodiments of this application.

Figure 1:
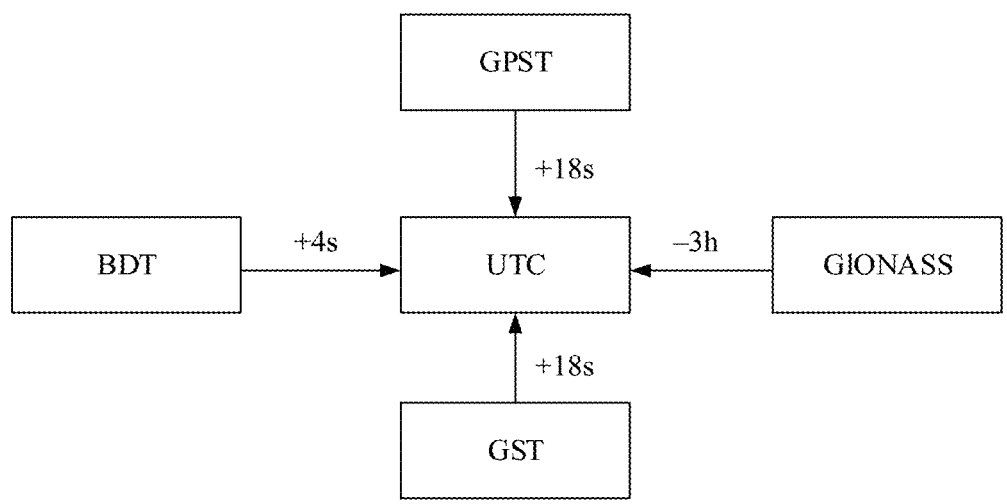
FIG. 1 is a diagram of a conversion relationship between different clock sources according to an embodiment of this application.

Clock source: Different operators in different areas may use different clock sources. The clock source includes at least a universal time coordinated (UTC), a global navigation satellite system (GNSS), or a local time. The GNSS includes the global positioning satellite (GPS), the Galileo (GST), a BeiDou time (BDT), and the GLONASS (GLONASS). FIG. 1 shows a second-level conversion relationship between different clock sources. It may be understood that FIG. 1 is merely an example, and should not be construed as a limitation on the embodiments of this application.

A time type in the embodiments of this application is a clock source. For example, a time type of a target time in time information delivered by an access network device may be a UTC type, a BDT type, a GST type, or the like. It may be understood that the time type may have another different name. This is not uniquely limited in the embodiments of this application. A target time type is a time type of the target time. When a first time type is one time type, the first time type may be the same as the target time type. It may be understood that if the access network device does not support the first time type, the first time type may be different from the target time type. When the first time type is at least two time types, the first time type includes at least the target time type. However, if the first time type does not include a time type supported by the access network device, the first time type does not include the target time type. It may be understood that the communication method in the embodiments of this application is shown when the access network device supports the first time type. Therefore, when the first time type is one time type, the first time type is the same as the target time type. Alternatively, in the embodiments of this application, when the first time type is one time type, according to another setting standard, the access network device possibly does not directly deliver a time of the first time type. However, the access network device indicates the first time type in a form of a time offset (where for details, refer to descriptions in the following embodiments). In this case, it may be considered that the first time type is different from the target time type, or it may be considered that the first time type is the same as the target time type. It may be understood that in the embodiments of this application, it is considered that the first time type is the same as the target time type, but it should not be construed as a limitation on the embodiments of this application. When the first time type is at least two time types, the first time type includes at least the target time type.

Both the first time type and the target time type are time types supported by a terminal device, and the second time type is a time type supported by the access network device.

Time precision: In different application scenarios, the terminal device may need different time precisions. For example, in a URLLC application scenario, the terminal device requires a time precision of 10 μs or 1 μs. Therefore, in different scenarios, time precisions needed by the terminal device may be different. In the embodiments of this application, a target time precision is a time precision of the target time. A first time precision is a time precision supported by the terminal device. The first time precision may be a lowest time precision supported by the terminal device, or may be a lowest time precision and a highest time precision that are supported by the terminal device, or may be a time precision between a lowest time precision and a highest time precision that are supported by the terminal device. An implementation of the first time precision is not limited in the embodiments of this application. For example, the first time precision may be 10 μs and 1 μs. For another example, the first time precision may alternatively be a lowest time precision of 10 μs needed by the terminal device.

A second time precision is a highest time precision supported by the access network device, or is at least two time precisions supported by the access network device. The highest time precision may also be understood as a maximum time precision. For example, among 20 μs, 10 μs, and 1 μs, the highest time precision is 1 μs, that is, the maximum time precision is 1 μs; and the lowest time precision is 20 μs, that is, the minimum time precision is 20 μs. In another technical field, the highest time precision may have another name. Therefore, the highest time precision in the embodiments of this application should not be construed as a limitation on this application.

The first time precision may have the following two cases: In a first case, the first time precision is a time synchronization precision required for synchronization between terminal devices. In a second case, the first time precision is a precision of a target time that the terminal device needs the access network device to deliver. For the first case, after receiving the time synchronization precision requirement, the access network device may determine, after calculating an air interface propagated error and a measurement error, a target time precision delivered to the terminal device. In other words, the first time precision may be the same as the target time precision, or may be different from the target time precision. For example, if the time synchronization precision needed by the terminal devices is 1 μs, a precision of the target time delivered by the access network device after calculation may be 0.5 μs. Alternatively, if the time precision needed by the terminal device is 1 μs, a precision of the target time delivered by the access network device is 1 μs. It may be understood that when the first time precision is the time precision in the first case, the terminal device may directly send a first indication message to the access network device, and does not need to listen to a broadcast message from the access network device. When the first time precision is the time precision in the second case, the terminal device may listen to the broadcast message, or may not listen to the broadcast message. This is not limited in this embodiment of this application.

It may be understood that in the embodiments of this application, there may be other descriptions for the time precision. For example, the time precision may be accuracy or a granularity. For another example, the time precision may also be understood as a time granularity, a time interval, or the like. Therefore, it should not be understood that a name of the time precision in this application is limited.

Time information: In this embodiment of this application, the time information may include only the target time. Optionally, the time information may further include the target time type and/or the target time precision. In other words, the time information may include the target time and the target time type, or may include the target time and the target time precision, or may include the target time, the target time type, and the target time precision. Content included in the time information may vary in different scenarios. The target time may be clock information. For example, the target time may be xx/xx/xx xx:xx.xxx.xxx, which is precise to microsecond. Alternatively, the target time may be xx/xx/xx xx:xx.xxx.xxx.xxx, which is precise to nanosecond, or the like.

Figure 2:
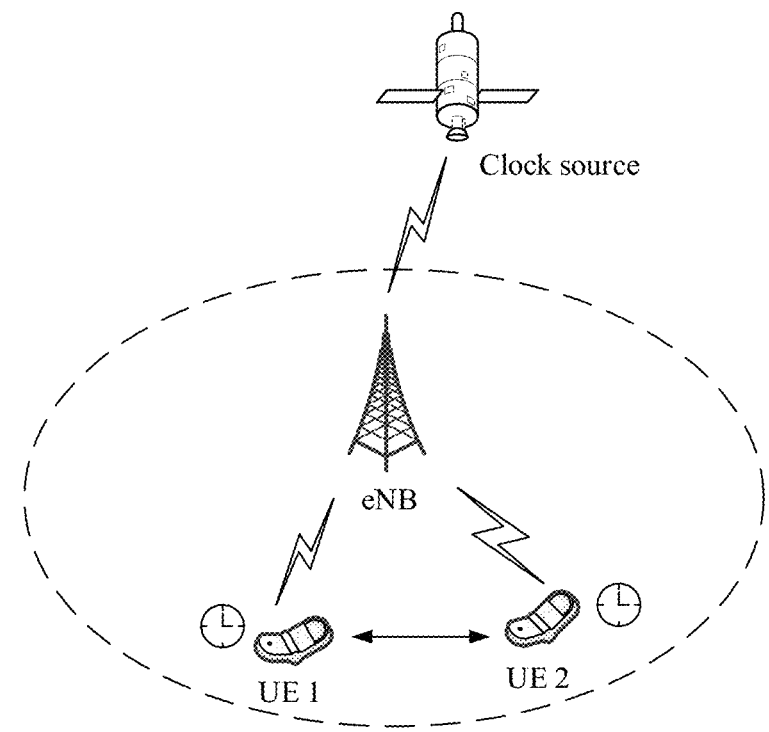
FIG. 2 is a schematic diagram of a communications system according to an embodiment of this application.

FIG. 2 is a schematic diagram of a communications system according to an embodiment of this application. The solutions in this application are applicable to the communications system. The communications system may include at least one access network device (where only one access network device is shown, for example, a base station eNB shown in the figure) and one or more terminal devices (user equipment, UE) (for example, UE 1 and UE 2 shown in the figure) connected to the access network device. It may be understood that the communications system may further include a core network (CN) device that is not shown in the figure.

The access network device may be a device that can communicate with the terminal device. The access network device may be any device that has a wireless transceiver function, including but not limited to a base station. For example, the base station may be a NodeB NodeB, an evolved NodeB eNodeB, a gNodeB gNB in a 5G communications system, or a base station in a future communications system. Optionally, the access network device may alternatively be an access node, a wireless relay node, a wireless backhaul node, or the like in a wireless local area network (wireless fidelity, Wi-Fi) system. Optionally, the access network device may be a radio controller in a cloud radio access network (CRAN) scenario. Optionally, the access network device may alternatively be a wearable device, a vehicle-mounted device, or the like. Optionally, the access network device may alternatively be a small cell, a transmission node (TRP), or the like. Certainly, this application is not limited thereto.

The terminal device is a device having a wireless transceiver function. The terminal device may be deployed on land, and includes an indoor device, an outdoor device, a handheld device, a wearable device, or a vehicle-mounted device; or may be deployed on a water surface, for example, on a ship; or may be deployed in the air, for example, on an airplane, a balloon, or a satellite. The terminal device may be a mobile phone, a tablet computer (pad), a computer with a wireless transceiver function, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. An application scenario is not limited in the embodiments of this application. The terminal device sometimes may be referred to as terminal equipment, an access terminal device, a mobile station, a mobile console, a remote station, a remote terminal device, a mobile device, a terminal, a wireless communications device, a UE agent, a UE apparatus, or the like.

Optionally, a clock source is also shown in the communications system shown in FIG. 2. In a communications system, a process in which a base station sends high-precision public reference clock time information to a terminal may be referred to as network high-precision time dissemination. The terminal device may need different time types or time precisions in different application scenarios. For example, different operators in different regions may use different clock sources. For example, China uses BeiDou, and the United States uses GPS. In addition, the terminal device may need to use different clock sources based on different requirements or configurations of application scenarios. Therefore, different terminal devices may need different clock sources when application scenario requirements are different. For example, in actual life, people usually use the UTC time reference, that is, UTC+8 h is the time used by people in daily life. However, the GNSS time may need to be used in many systems. Application scenarios of the GNSS time include a financial service, a microgrid, military affairs, and the like. Therefore, an embodiment of this application provides a communication method, so that a terminal device can obtain time information as required.

Figure 3:
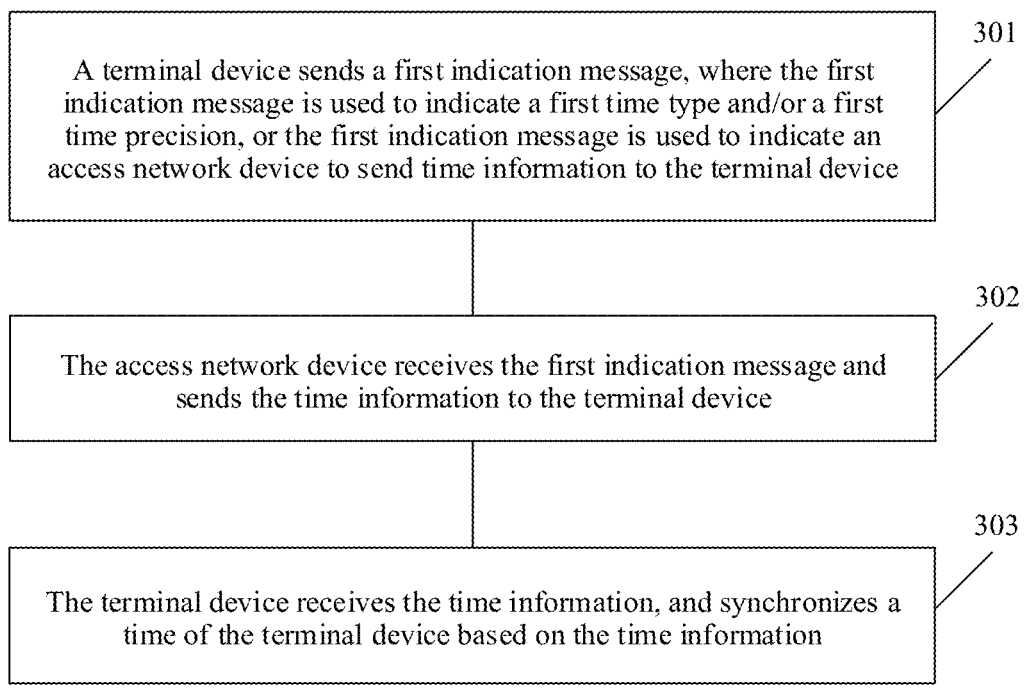
FIG. 3 is a schematic flowchart of a communication method according to an embodiment of this application.

FIG. 3 is a schematic flowchart of a communication method according to an embodiment of this application. As shown in FIG. 3, the communication method includes at least the following steps.

301. A terminal device sends a first indication message, where the first indication message is used to indicate a first time type and/or a first time precision, or the first indication message is used to indicate an access network device to send time information to the terminal device.

In this embodiment of this application, when the first time type is one time type, the first indication message may be used to indicate a target time type. In this case, the first time type is the same as the target time type. In other words, the first indication message may be used to indicate a time at which the access network device delivers the first time type to the terminal device. When the first time type is at least two time types, the first indication message may be used to indicate the access network device to determine the target time type. When the first time type is at least two time types, the access network device may select one time type from the first time type as a time type of a target time. A time type selected by the access network device from the first time type is not uniquely limited in the embodiments of this application.

In this embodiment of this application, the first indication message may further be used to indicate a target time precision, or the first indication message is used to indicate the access network device to determine a target time precision. A highest time precision indicated in the first time precision may be the same as the target time precision, but it is possible that the target time precision is less than the highest time precision indicated in the first time precision. In this embodiment of this application, a relationship between the first time precision and the target time precision may vary with a situation.

It may be understood that the first indication message carries information related to the target time.

It may be understood that when the first time type is at least two time types, the first indication message may be in a form of a character string bitmap. Each bit in the bitmap corresponds to one time type. For example, a bit being 1 indicates that a base station supports the time type, and the bit being 0 indicates that the base station does not support the time type. However, when the first time type is one time type, the first indication message may carry an identifier of the first time type, so that the access network device can clearly learn of a time type of the first time type by using the carried identifier.

In a possible implementation, if the terminal device has determined the target time type and the target time precision through negotiation with the access network device, or the terminal device has learned, in advance, of a type and a precision of the target time that is to be delivered by the access network device, the first indication message may further be used to activate the access network device to send the time information to the terminal device. In other words, the first indication message may not carry the information related to the target time, and is used only for the activation. For example, the first indication message is used to activate the access network device to send the time information to the terminal device in unicast mode. As may be understood, that the first indication message is used to activate the access network device to send the time information to the terminal device in unicast mode is merely an example, and should not be construed as a limitation on this embodiment of this application.

Alternatively, if the first indication message is used only to activate the access network device to send the time information to the terminal device, and the access network device cannot clearly learn of a time type and a time precision that are needed by the terminal device, the access network device may send a second indication message and the like to the terminal device. This is not limited in this embodiment of this application.

Alternatively, if the first indication message is used only to activate the access network device to send the time information to the terminal device, and the access network device does not send the second indication message to the terminal device, the access network device directly delivers the time information to the terminal device.

Alternatively, if the first indication message is used only to activate the access network device to send the time information to the terminal device, the access network device may send the time information including the target time, a time type of the target time, and/or a time precision of the target time to the terminal device. The foregoing implementations are not limited in this embodiment of this application.

In a possible implementation, the first indication message may further include a priority of the first time type. In other words, the terminal device may indicate a time type most needed by the terminal device, a secondary time type, or the like to the access network device in this manner, so that the access network device sends the time information to the terminal device, thereby improving efficiency of obtaining the target time type by the terminal device. It may be understood that, when the first time precision is a lowest time precision supported by the terminal device, the access network device may select, based on the first time precision, a time precision that is the same as the first time precision, or may select a time precision that is higher than the first time precision. When the first time precision is a lowest time precision and a highest time precision that are supported by the terminal device, the access network device may preferentially select the highest time precision. When the first time precision is at least two time precisions supported by the terminal device, the access network device may automatically select a highest time precision based on the first time precision. If the access network device cannot support a highest time precision in the first time precision, the access network device may select a second highest time precision from the first time precision. In other words, the access network device may select a relatively high time precision based on a requirement of the terminal device, and send the time precision to the terminal device.

In this embodiment of this application, the terminal device may directly send the first indication message to the access network device, or may send the first indication message to the access network device by using a core network device, as shown below:

That a terminal device sends a first indication message includes:

sending, by the terminal device, the first indication message to the access network device by using radio resource control (RRC) signaling or a medium access control control element (MAC CE); or sending, by the terminal device, the first indication message to the core network device, where the first indication message is used to indicate the core network device to send the first indication message to the access network device.

In this embodiment of this application, the terminal device may send the first indication message to the access network device by using the RRC signaling or the MAC CE. For example, the RRC signaling may be user equipment assistance information (UE assistance information). That is, the first indication message may alternatively be carried in the UE auxiliary information. Alternatively, the terminal device may send the first indication message to the core network device by using a non-access stratum (NAS) message, and the core network device may send the first indication message to the access network device through an interface. For example, the interface may be an Si interface, and the Si interface may be an interface between an access network device such as a base station eNB and a packet core network (EPC). It may be understood that the foregoing interface is merely an example, and should not be construed as a limitation on this embodiment of this application.

In this embodiment of this application, after the terminal device sends the first indication message to the core network device, the core network device may store the first indication message, and the core network device sends the first indication message to the access network device. By storing the first indication message, the core network device can send the first indication message to the access network device when the terminal device changes from an idle state to a connected state, thereby improving efficiency of receiving the time information by the terminal device. The connected state may be understood as that the terminal device connects to a network.

In a possible implementation, the terminal device may access the core network device by using an attach procedure. After receiving the first indication message, the core network device notifies the access network device of the first indication message through an interface between the core network device and the access network device. If the access network device does not receive the first indication message, the access network device may send a request message to the terminal device, where the request message may be used to indicate the terminal device to send the first indication message to the access network device.

302. The access network device receives the first indication message, and sends the time information to the terminal device.

In this embodiment of this application, when the first time type is one time type, the access network device can clearly learn of a time type needed by the terminal device, and then may directly send the time information to the terminal device. The time information may include only the target time, thereby reducing signaling overheads. When the first time type is at least two time types, the access network device may determine the target time type based on a time type supported by the access network device, or the access network device may independently select a time type from the first time type to determine the target time type. When the first indication message includes the priority of the first time type, the access network device may determine the target time type based on the priority. In this way, the access network device sends the time information to the terminal device, and the time information may include the target time and the target time type. Optionally, the time information in the foregoing two cases may further include the target time precision, to indicate a precision of the target time to the terminal device.

When the access network device supports the first time precision, the access network device may directly send the time information to the terminal device, and the time information may include only the target time. Alternatively, the time information may further include the target time type. When the highest time precision indicated in the first time precision is a time precision that cannot be supported by the access network device, the access network device may determine the target time precision based on a time precision supported by the access network device. In this way, the access network device sends the time information to the terminal device, and the time information may include the target time and the target time precision. Alternatively, the time information further includes the target time type.

It may be understood that when the first indication message includes both a time type and a time precision, the first time type is one time type, and the access network device supports the first time precision, the time information may include only the target time. When the first time type is at least two time types, and the access network device cannot support the highest time precision indicated in the first time precision, the time information may include not only the target time, but also the target time type and the target time precision.

In this embodiment of this application, when the first indication message is used to indicate the access network device to send the time information to the terminal device, and the access network device does not know the time type and the time precision that are needed by the terminal device, the time information may include the target time, the target time type, and the target time precision. When the access network device knows the time type and the time precision that are needed by the terminal device, the time information may include only the target time.

It may be understood that, in this embodiment of this application, the time information may include only the target time. Alternatively, the time information includes the target time and the target time type. Alternatively, the time information includes the target time and the target time precision. Alternatively, the time information includes the target time, the target time type, and the target time precision. The access network device may send, as required, time information including different information.

303. The terminal device receives the time information, and synchronizes a time of the terminal device based on the time information.

By implementing the embodiments of this application, requirements of the terminal device for a type and/or a precision of the target time in a current scenario can be met, thereby avoiding a case in which the target time delivered by the access network device cannot meet the requirements of the terminal device in the current scenario, and improving time synchronization efficiency of the terminal device.

To better understand the communication method provided in the embodiments of this application, the following describes the communication method. It may be understood that the following embodiments are shown when the access network device is a base station, but should not be construed as a limitation on this application. An example in which the terminal device directly sends the first indication message to the base station is used below for description, but should not be construed as a limitation on this application.

Embodiment 1

In this embodiment, a terminal device actively sends a first indication message to a base station, where the first indication message is used to indicate a first time type and/or a first time precision.

Figure 4:
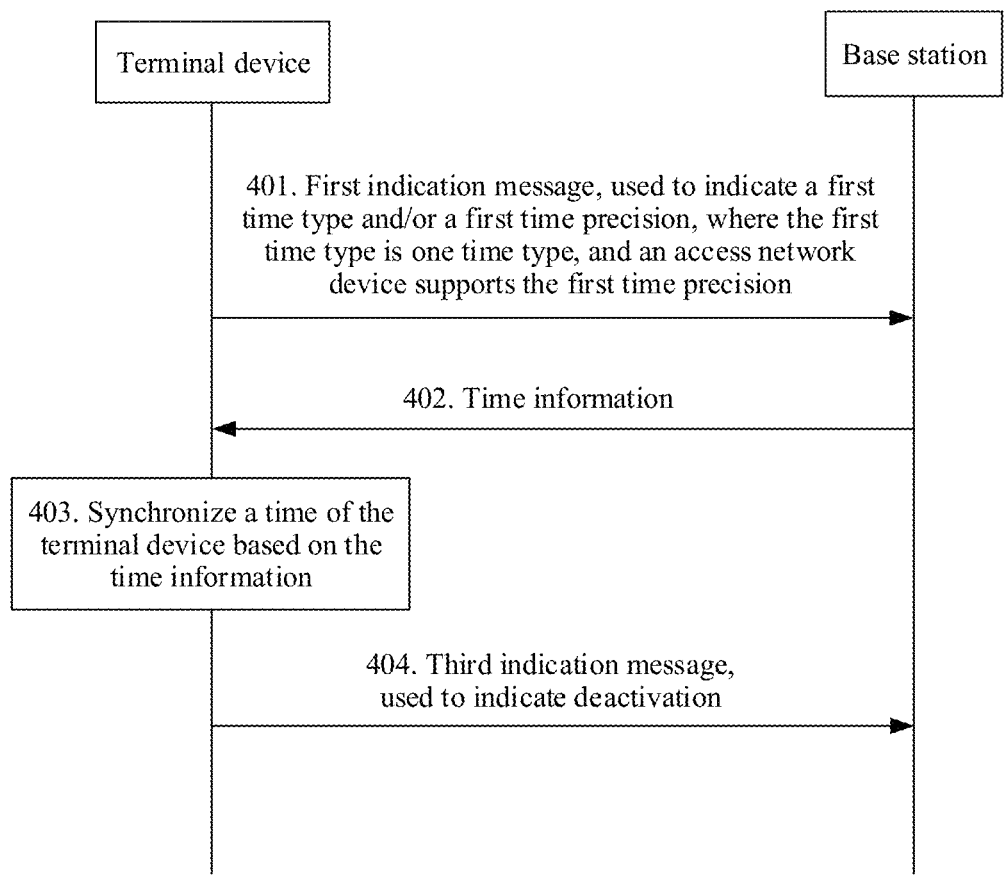
FIG. 4 is a schematic diagram of a scenario of a communication method according to an embodiment of this application.

FIG. 4 is a schematic diagram of a scenario of a communication method according to this embodiment of this application. As shown in FIG. 4, the communication method includes at least the following steps.

401. The terminal device sends the first indication information to the base station, where the first indication message is used to indicate the first time type and/or the first time precision, the first time type is one time type, and the access network device supports the first time precision.

It may be understood that, because the terminal device actively sends the first indication message to the base station, the first indication message may further activate, by default, the base station to send time information to the terminal device.

In a possible implementation, before the terminal device sends the first indication message to the base station, the base station may further send a broadcast message to the terminal device. After receiving the broadcast message, the terminal device determines the first time type and/or the first time precision based on the message broadcast by the base station. The broadcast message is used to broadcast a second time type and/or a second time precision.

402. The base station receives the first indication message, and the base station sends the time information to the terminal device.

The base station may directly deliver, based on the first time type, a time type most needed by the terminal device. For example, if the terminal device requests a GPS time, the base station delivers the corresponding GPS time to the terminal device. For another example, the base station may preset a time type as a time reference. For example, if the time reference is the UTC time, and the first time type is the BDT time, the base station may deliver the UTC time and a time offset between the UTC time and the BDT time. In other words, the terminal device may determine the BDT time based on the UTC time and the time offset. For another example, the base station may further directly deliver a corresponding time type, namely, the first time type, based on a requirement of the terminal device, and the time information may further include a time offset between the first time type and the UTC time, so that the terminal device directly performs conversion if required.

It may be understood that, because a propagation delay error between the base station and the terminal device affects high-precision synchronization of the terminal device, the time information sent by the base station may be a time obtained after the base station performs propagation delay compensation based on a local accurate time. A propagation delay between the base station and the terminal device may be roughly obtained through estimation by using a timing advance (TA). Optionally, the terminal device may also compensate for the obtained time information based on the propagation delay error between the terminal device and the base station. A compensation method may depend on implementation of the base station or the terminal device. This is not limited herein.

In a possible implementation, before sending the time information to the terminal device, the base station may further send a first feedback message to the terminal device, where the first feedback message is used to indicate whether the base station processes the first indication message.

403. The terminal device receives the time information, and synchronizes a time of the terminal device based on the time information.

404. The terminal device sends a third indication message to the base station, where the third indication message is used to indicate to deactivate the base station to send the time information to the terminal device.

In this embodiment of this application, the terminal device explicitly indicates a time type and/or a time precision to the base station, so that the base station directly delivers a target time to the terminal device, thereby effectively reducing signaling overheads and improving time synchronization efficiency of the terminal device. Further, when the terminal device does not need the base station to send the time information in unicast mode, the terminal device sends the third indication message to the base station, so that resources are saved, and an unnecessary resource waste is avoided.

Embodiment 2

In this embodiment, a terminal device actively sends a first indication message to a base station, where the first indication message is used to indicate a first time type and/or a first time precision.

Figure 5:
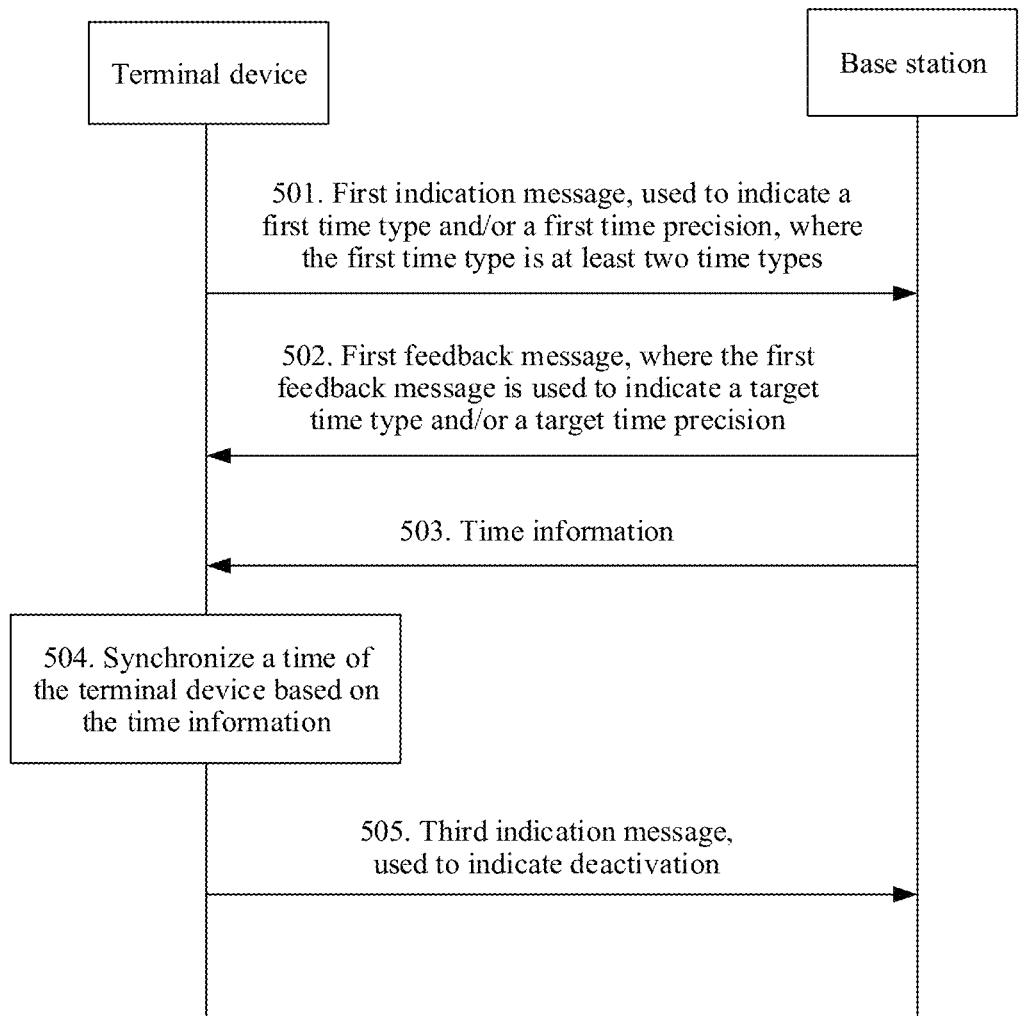
FIG. 5 is a schematic diagram of a scenario of a communication method according to an embodiment of this application.

FIG. 5 is a schematic diagram of a scenario of a communication method according to this embodiment of this application. As shown in FIG. 5, the communication method includes at least the following steps.

501. The terminal device sends the first indication message to the base station, where the first indication message is used to indicate the first time type and/or the first time precision, and the first time type is at least two time types.

502. The base station receives the first indication message, and sends a first feedback message to the terminal device, where the first feedback message is used to indicate a target time type and/or a target time precision.

In this embodiment of this application, because the terminal device has not explicitly indicated the target time type, the base station may send the first feedback message to the terminal device, so that the terminal device can clearly learn of a time type and/or a time precision of a target time. In addition, in this embodiment of this application, because the base station sends the first feedback message to the terminal device, it is also considered by default that the base station supports the time type and/or the time precision that are/is indicated in the first indication message.

503. The base station sends time information to the terminal device.

In this embodiment of this application, because the terminal device has indicated the target time type and/or the target time precision to the base station, the time information may include only the target time.

504. The terminal device receives the first feedback message and the time information, and synchronizes a time of the terminal device based on the time information.

505. The terminal device sends a third indication message to the base station, where the third indication message is used to indicate to deactivate the base station to send the time information to the terminal device.

Embodiment 3

In this embodiment, a terminal device actively sends a first indication message to a base station, where the first indication message is used to indicate a first time type and/or a first time precision.

Figure 6:
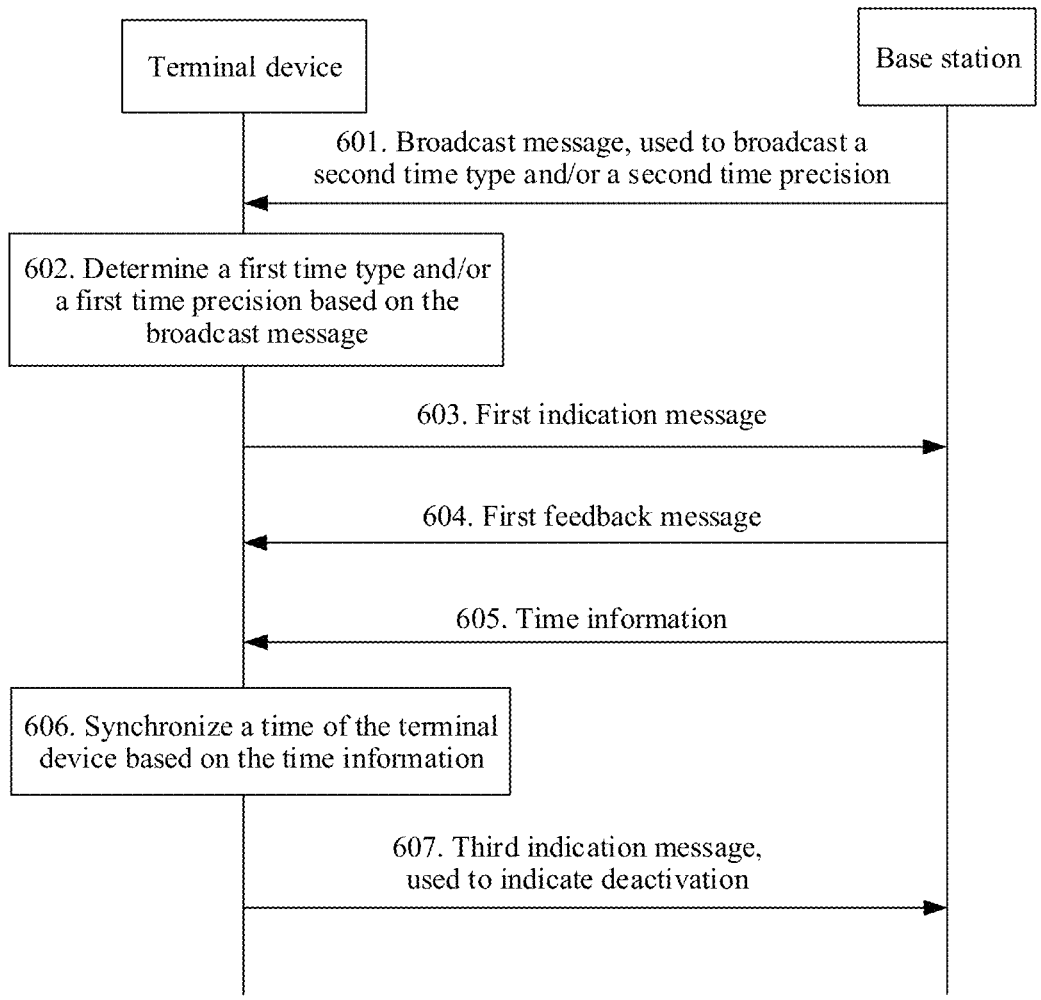
FIG. 6 is a schematic diagram of a scenario of a communication method according to an embodiment of this application.

FIG. 6 is a schematic diagram of a scenario of a communication method according to this embodiment of this application. As shown in FIG. 6, the communication method includes at least the following steps.

601. The base station sends a broadcast message, where the broadcast message is used to broadcast a second time type and/or a second time precision.

In this embodiment of this application, when the base station broadcasts the second time type and/or the second time precision, the broadcast message may further be used to indicate whether the base station supports sending time information in unicast mode. If the base station does not support sending the time information in unicast mode, the terminal device may not send the first indication message to the base station. For example, the terminal device may send the first indication message to another base station, and the another base station may be a base station in a dual-connectivity scenario. It may be understood that the foregoing is merely an example, and should not be construed as a limitation on this embodiment of this application. If the base station supports sending the time information in unicast mode, the terminal device may send the first indication message based on an application requirement. If the second time type broadcast by the base station does not include a time type needed or supported by the terminal device, the terminal device may not send the first indication message to the base station. Alternatively, when the second time precision broadcast by the base station is lower than or does not include a time precision needed or supported by the terminal device, the terminal device may not send the first indication message to the base station. In this way, efficiency or feasibility of sending the first indication message by the terminal device is improved.

The second time type broadcast by the base station may be a time type directly obtained by the base station from a clock source, or may be a time type obtained by the base station through conversion between clock sources. This is not limited in this embodiment of this application.

When the base station broadcasts the second time type, support statuses for all time types may be included. For example, a form of a character string bitmap may be used. Each bit in the bitmap corresponds to one time type. For example, a bit being 1 indicates that the base station supports the time type, and the bit being 0 indicates that the base station does not support the time type. If the bitmap is all zeros, it indicates that the base station does not support a unicast time dissemination function.

In this embodiment of this application, the second time type may be one time type, or may be at least two time types. The second time precision may be a highest time precision supported by the base station or at least two time precisions supported by the base station.

602. The terminal device determines the first time type and/or the first time precision based on the broadcast message.

In this embodiment of this application, when the terminal device needs a time of another time type (for example, a time type different from that in a SIB 16) and/or a time of another time precision based on a current scenario, the terminal device may determine the first time type and/or the first time precision based on the broadcast message. For example, the terminal device may select, from the second time type, a time type suitable for a current application scenario as the first time type. In this case, the second time type may include the first time type, and the first time type is the same as a target time type. Alternatively, if there is no time type suitable for a current application scenario of the terminal device in the second time type, the terminal device may select a most related time type from the second time type as the first time type. The first time type may be one time type, or may be at least two time types. Different time types are selected in different scenarios of the terminal device. For example, a terminal device used for internet synchronization may use a UTC time, and a terminal device used for finance or a power grid may use a GPS time.

A highest time precision indicated in the first time precision may be the same as the highest time precision indicated in the second time precision. Alternatively, a highest time precision indicated in the first time precision may be less than the highest time precision indicated in the second time precision. This is not limited in this embodiment of this application. Different time precisions are selected for different scenarios of the terminal device. For example, if the terminal device is a terminal device (for example, an industrial robot) for motion control in industry, a time synchronization requirement between terminal devices is 1 μs. If the terminal device is a terminal device (for example, a microphone) in a conference system, a synchronization precision requirement between terminal devices is 20 μs. It can be understood that the foregoing is merely an example.

603. The terminal device sends the first indication message to the base station.

The first indication message is used to indicate the first time type and/or the first time precision. It may be understood that, because the terminal device actively sends the first indication message to the base station, the first indication message may further activate, by default, the base station to send the time information to the terminal device.

In a possible implementation, the first indication message may further include a priority of the first time type.

604. The base station receives the first indication message, and sends a first feedback message to the terminal device, where the first feedback message is used to indicate whether the base station processes the first indication message, or the first feedback message is used to indicate the target time type and/or a target time precision.

The first feedback message may be an ACK message, and may be used to indicate that the base station has received and accepted the first indication message of the terminal device. Alternatively, the first feedback message may be a NACK message, and may be used to indicate that the base station currently cannot send the time information to the terminal device. Optionally, when the first feedback message is a NACK message, the first feedback message may further include a first field, and the first field may be used to indicate a reason why the base station cannot send the time information to the terminal device. For example, the first field may include at least the following four reasons: a. The base station does not support a capability of sending the time information in unicast mode. b. The base station cannot provide a time type or a time precision needed by the terminal device. c. The base station is overloaded and cannot send the time information to the terminal device in unicast mode temporarily. d. The terminal device does not have a permission to receive the time information in unicast mode. It can be understood that the foregoing four reasons are merely examples.

In a possible implementation, the base station may further feed back a time type and a time precision of the to-be-delivered target time. By sending the first feedback message, the terminal device can clearly learn of the time type and the time precision of the target time delivered by the base station; and when the base station delivers the time information, the time information may include only the target time, thereby reducing signaling overheads.

It may be understood that, during an implementation, the base station may alternatively not send the first feedback message to the terminal device. In a possible implementation, the terminal device may use a timer. After sending the first indication message, the terminal device starts the timer, and the timer stops timing when the terminal device receives the time information sent by the base station. If the timer expires, the terminal device may re-initiate the first indication message, and stop sending the first indication message when a quantity of times of repeatedly sending the first indication message exceeds a maximum quantity of repetition times.

It may be understood that, in this embodiment of this application, the terminal device may send the first indication message to the base station by using RRC signaling or a MAC CE. Therefore, when the base station sends the first feedback message to the terminal device and the first feedback message is used to indicate the target time type and/or the target time precision, the base station may send the first feedback message to the terminal device by using the RRC signaling or the MAC CE. Alternatively, the base station may send the first feedback message to the terminal device by using downlink control information (DCI). This is not limited in this embodiment of this application.

605. The base station sends the time information to the terminal device.

When the base station sends the first feedback message to the terminal device and the first feedback message is used to indicate the target time type and the target time precision, the time information may include only the target time.

606. The terminal device receives the time information, and synchronizes a time of the terminal device based on the time information.

607. The terminal device sends a third indication message to the base station, where the third indication message is used to indicate to deactivate the base station to send the time information to the terminal device.

After receiving the third indication message, the base station may not send the time information to the terminal device. In other words, after the terminal device sends the third indication message to the base station, if the terminal device does not receive the time information, the terminal device may consider by default that the base station has received the third indication message. Alternatively, in a possible implementation, the base station may further send an acknowledgment message to the terminal device, where the acknowledgment message is used to indicate that the base station has received the third indication message. If the base station does not receive the third indication message, the base station may further send the time information to the terminal device. In this case, the terminal device may send the third indication message to the base station again.

In this embodiment of this application, when the terminal device does not need the base station to send the time information in unicast mode, the terminal device may send the third indication message to the base station to indicate the base station to stop sending the time information to the terminal device in unicast mode. In this way, consumed air interface resources are reduced.

Embodiment 4

In this embodiment, a terminal device actively sends a first indication message to a base station, where the first indication message is used to indicate the base station to send time information to the terminal device.

Figure 7:
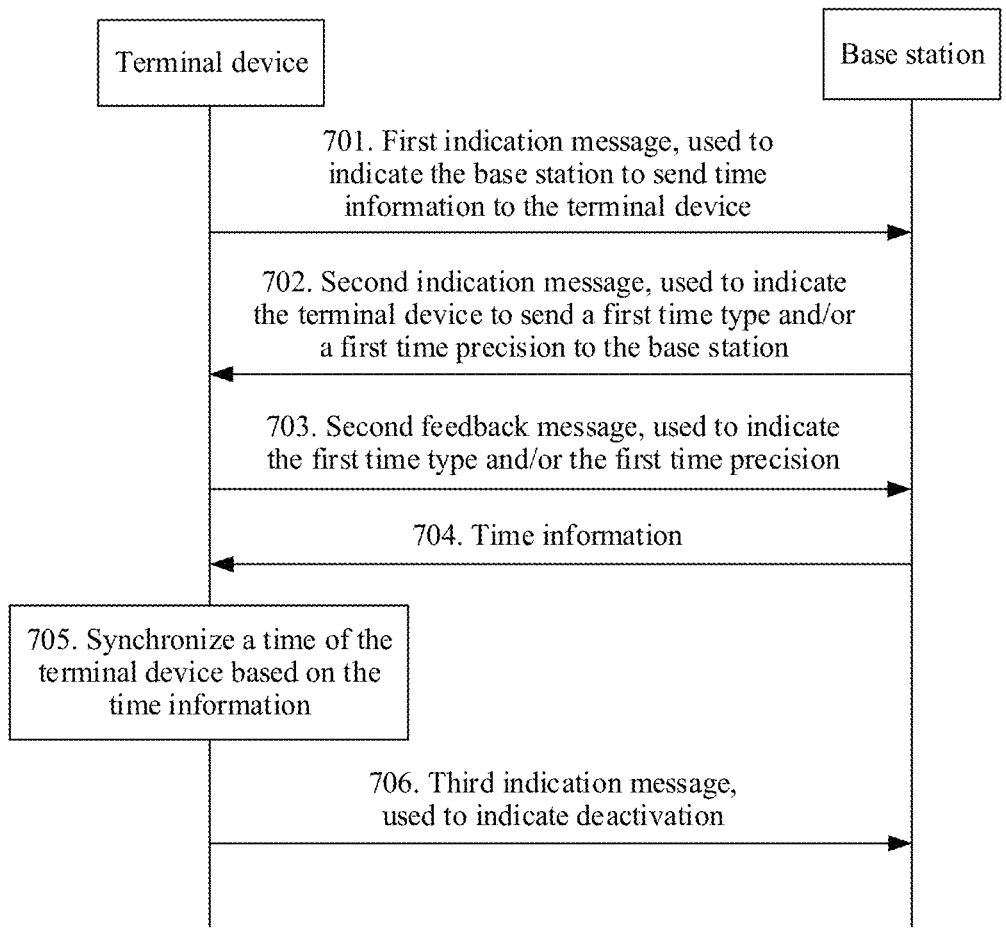
FIG. 7 is a schematic diagram of a scenario of a communication method according to an embodiment of this application.

FIG. 7 is a schematic diagram of a scenario of a communication method according to this embodiment of this application. As shown in FIG. 7, the communication method includes at least the following steps.

701. The terminal device sends the first indication message to the base station, where the first indication message is used to indicate the base station to send the time information to the terminal device.

702. The base station receives the first indication message, and sends a second indication message to the terminal device, where the second indication message is used to indicate the terminal device to send a first time type and/or a first time precision to the base station.

In this embodiment of this application, the second indication message may be used to indicate by default that the base station accepts the first indication message of the terminal device, in other words, the second indication message indicates by default the base station to process the first indication message.

703. The terminal device receives the second indication message, and sends a second feedback message to the base station, where the second feedback message is used to indicate the first time type and/or the first time precision.

704. The base station receives the second feedback message, and the base station sends the time information to the terminal device based on the second feedback message.

In this embodiment of this application, after receiving the first indication message, the base station may alternatively not send the second indication message to the terminal device. In other words, after receiving the first indication message, the base station may directly send the time information to the terminal device. A difference lies in that in this case, the time information may include a target time, a target time type, and a time offset between the target time type and another time type, so that the terminal device can independently select a time as required. It may be understood that when the time information includes the target time, the target time type, and the time offset between the target time type and the another time type, the time information may include a second field, and the second field is used to indicate the time offset between the target time type and the another time type. By using the second field, the terminal device can clearly learn that a time offset is between the target time type and which time type.

705. The terminal device receives the time information, and synchronizes a time of the terminal device based on the time information.

706. The terminal device sends a third indication message to the base station, where the third indication message is used to indicate to deactivate the base station to send the time information to the terminal device.

It may be understood that focuses of the foregoing embodiments may be different. Therefore, for an implementation that is not described in detail, refer to another embodiment. Details are not described herein again.

The foregoing describes in detail the methods in the embodiments of this application. The following provides apparatuses in the embodiments of this application.

Figure 8:
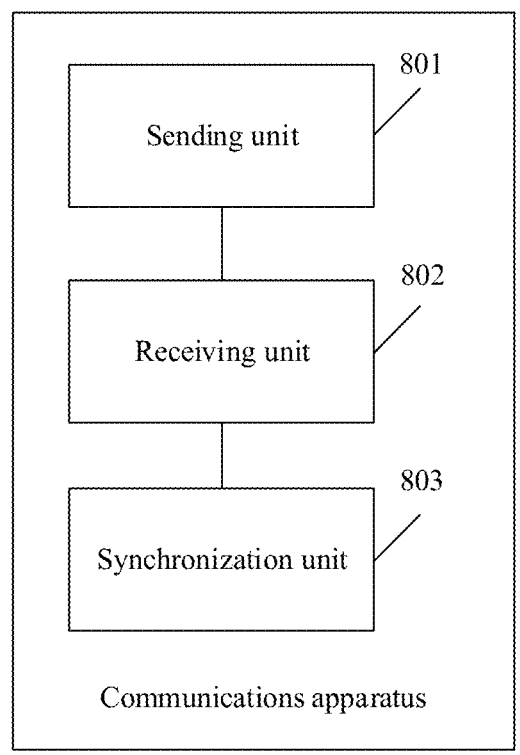
FIG. 8 is a schematic structural diagram of a communications apparatus according to an embodiment of this application.

FIG. 8 is a schematic structural diagram of a communications apparatus according to an embodiment of this application. The communications apparatus may be a terminal device, or may be a chip applied to a terminal device. As shown in FIG. 8, the communications apparatus may include:

a sending unit 801, configured to send a first indication message, where the first indication message is used to indicate a first time type and/or a first time precision, or the first indication message is used to indicate an access network device to send time information to a terminal device;

a receiving unit 802, configured to receive the time information; and a synchronization unit 803, configured to synchronize a time of the terminal device based on the time information.

By implementing this embodiment of this application, requirements of the terminal device for a type and/or a precision of a target time in a current scenario can be met, thereby avoiding a case in which the target time delivered by the access network device cannot meet the requirements of the terminal device in the current scenario, and improving time synchronization efficiency of the terminal device.

In a possible implementation, when the first time type is at least two time types supported by the terminal device, the first indication message includes a priority of the first time type, where the priority of the first time type is used to indicate that the access network device determines a target time type based on the priority of the first time type, the target time type is a time type of the target time, and the target time is a time in the time information.

In a possible implementation, when the first indication message is used to indicate the access network device to send the time information to the terminal device, the receiving unit 802 is further configured to receive a second indication message sent by the access network device, where the second indication message is used to indicate the terminal device to send the first time type and/or the first time precision to the access network device; and the sending unit 801 is further configured to send a second feedback message to the access network device, where the second feedback message is used to indicate the first time type and/or the first time precision.

In a possible implementation, the receiving unit 802 is further configured to receive a broadcast message from the access network device, where the broadcast message is used to broadcast a second time type and/or a second time precision, the second time type is a time type supported by the access network device, and the second time precision is a time precision supported by the access network device.

In a possible implementation, the sending unit 801 is configured to send the first indication message to the access network device by using radio resource control (RRC) signaling or a medium access control control element (MAC CE); or the sending unit 801 is configured to send the first indication message to a core network device, where the first indication message is used to indicate the core network device to send the first indication message to the access network device.

In a possible implementation, the receiving unit 802 is further configured to receive a first feedback message sent by the access network device, where the first feedback message is used to indicate whether the access network device processes the first indication message, or the first feedback message is used to indicate the target time type and/or a target time precision.

In a possible implementation, the sending unit 801 is further configured to send a third indication message to the access network device, where the third indication message is used to indicate to deactivate the access network device to send the time information to the terminal device.

The time information includes the target time; or the time information includes the target time, and the time information further includes the target time type and/or the target time precision.

It should be noted that the communications apparatus shown in FIG. 8 may further be configured to perform the procedures of the communication methods shown in FIG. 3 to FIG. 7. Therefore, for an implementation of each unit, refer to corresponding descriptions of the method embodiments shown in FIG. 3 to FIG. 7. Details are not described herein again.

Figure 9:
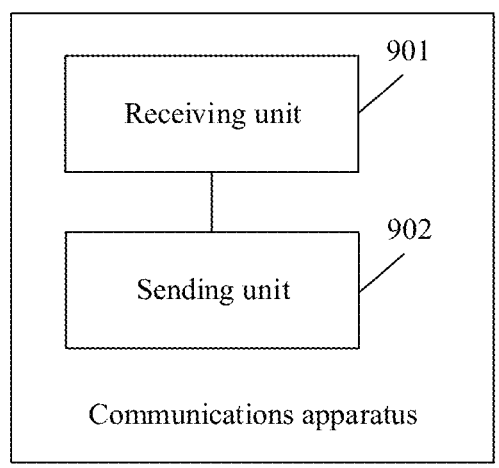
FIG. 9 is a schematic structural diagram of a communications apparatus according to an embodiment of this application.

FIG. 9 is a schematic structural diagram of a communications apparatus according to an embodiment of this application. The communications apparatus may be an access network device, or may be a chip applied to an access network device. As shown in FIG. 9, the communications apparatus may include:

a receiving unit 901, configured to receive a first indication message, where the first indication message is used to indicate a first time type and/or a first time precision, or the first indication message is used to indicate an access network device to send time information to a terminal device; and a sending unit 902, configured to send the time information to the terminal device, where the time information is used to indicate the terminal device to synchronize a time of the terminal device.

In a possible implementation, when the first time type is at least two time types supported by the terminal device, the first indication message includes a priority of the first time type, where the priority of the first time type is used to indicate that the access network device determines a target time type based on the priority of the first time type, the target time type is a time type of the target time, and the target time is a time in the time information.

In a possible implementation, when the first indication message is used to indicate the access network device to send the time information to the terminal device, the sending unit 902 is further configured to send a second indication message to the terminal device, where the second indication message is used to indicate the terminal device to send the first time type and/or the first time precision to the access network device; and the receiving unit 901 is further configured to receive a second feedback message sent by the terminal device, where the second feedback message is used to indicate the first time type and/or the first time precision.

In a possible implementation, the sending unit is further configured to send a broadcast message to the terminal device, where the broadcast message is used to broadcast a second time type and/or a second time precision, the second time type is a time type supported by the access network device, and the second time precision is a time precision supported by the access network device.

The receiving unit 901 is configured to receive, by using radio resource control RRC signaling or a medium access control control element (MAC CE), the first indication message sent by the terminal device; or the receiving unit 901 is configured to receive the first indication message sent by a core network device, where the first indication message is a message sent by the terminal device to the core network device.

In a possible implementation, the sending unit 902 is further configured to send a first feedback message to the terminal device, where the first feedback message is used to indicate whether the access network device processes the first indication message, or the first feedback message is used to indicate the target time type and/or a target time precision.

In a possible implementation, the receiving unit 901 is further configured to receive a third indication message sent by the terminal device, where the third indication message is used to indicate to deactivate the access network device to send the time information to the terminal device.

The time information includes the target time; or the time information includes the target time, and the time information further includes the target time type and/or the target time precision.

Figure 10:
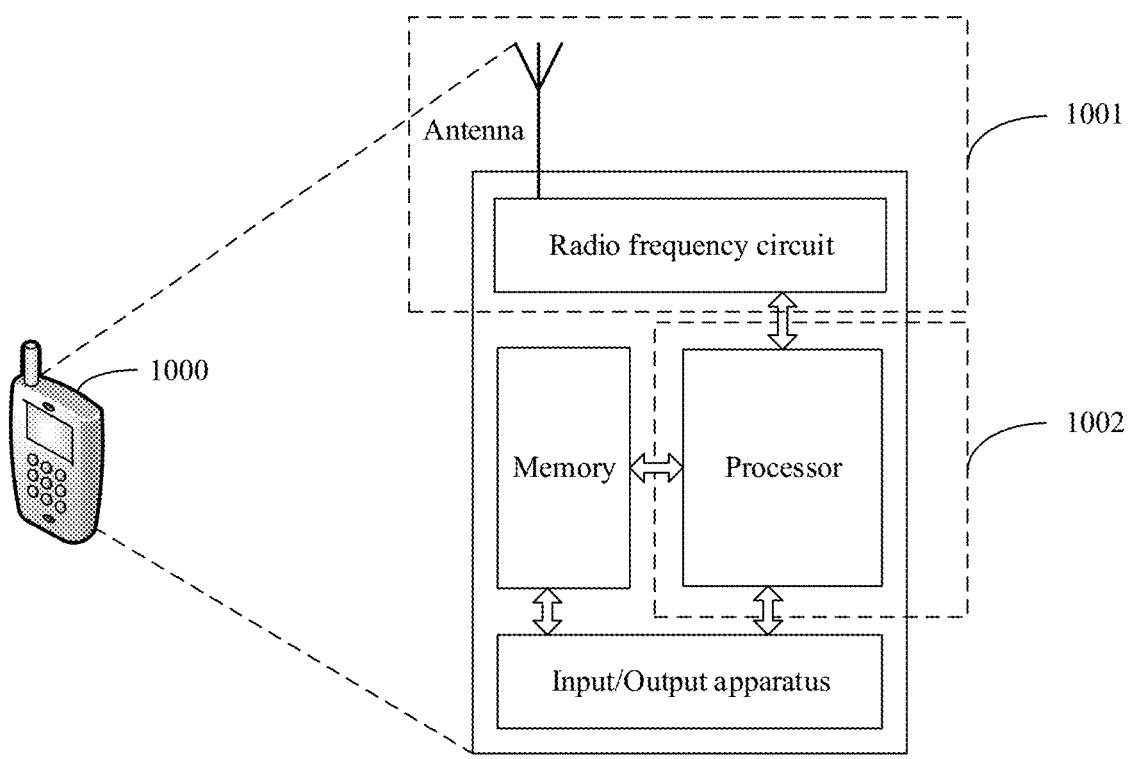
FIG. 10 is a schematic structural diagram of a terminal device according to an embodiment of this application.

For example, the communications apparatus is a terminal device. FIG. 10 is a schematic structural diagram of a terminal device 1000 according to an embodiment of this application. The terminal device may perform the operations of the terminal device in the methods shown in FIG. 3 to FIG. 7, or the terminal device may perform the operations of the communications apparatus shown in FIG. 8.

For ease of description, FIG. 10 shows only main components of the terminal device. As shown in FIG. 10, the terminal device 1000 includes a processor, a memory, a radio frequency circuit, an antenna, and an input/output apparatus. The processor is mainly configured to: process a communications protocol and communications data, control the entire terminal device, execute a software program, and process data of the software program, for example, configured to support the terminal device in performing the function of synchronizing time information in the procedures described in FIG. 3 to FIG. 7. The memory is mainly configured to store a software program and data. The radio frequency circuit is mainly configured to: perform conversion between a baseband signal and a radio frequency signal, and process the radio frequency signal. The antenna is mainly configured to receive and send a radio frequency signal in a form of an electromagnetic wave. It may be understood that the antenna may also be referred to as a transceiver. For example, the transceiver may be configured to perform step 301 in FIG. 3 to send the first indication message. For details, refer to descriptions of the foregoing related parts. For another example, the transceiver may be configured to perform step 303 in FIG. 3 to receive the time information. For details, refer to descriptions of the foregoing related parts. The terminal device 1000 may further include the input/output apparatus, such as a touchscreen, a display screen, or a keyboard, and is mainly configured to: receive data entered by a user, and output data to the user. It should be noted that some types of terminal devices may have no input/output apparatus. This is not limited in this application.

After the terminal device is powered on, the processor may read a software program in a storage unit, explain and execute an instruction of the software program, and process data of the software program. When data needs to be sent in a wireless manner, after performing baseband processing on the to-be-sent data, the processor outputs a baseband signal to the radio frequency circuit. After performing radio frequency processing on the baseband signal, the radio frequency circuit sends a radio frequency signal through an antenna in a form of an electromagnetic wave. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that for ease of description, FIG. 10 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In an optional implementation, the processor may include a baseband processor and a central processing unit (CPU). The baseband processor is mainly configured to process a communications protocol and communications data. The CPU is mainly configured to: control the entire terminal device, execute a software program, and process data of the software program. Optionally, the processor may alternatively be a network processor (NP) or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof. The memory may include a volatile memory for example, a random-access memory (RAM). The memory may alternatively include a non-volatile memory, for example, a flash memory, a hard disk drive (HDD), or a solid-state drive (SSD). The memory may alternatively include a combination of the foregoing types of memories.

For example, the processor in FIG. 10 integrates functions of the baseband processor and the central processing unit. A person skilled in the art may understand that the baseband processor and the central processing unit may be respectively independent processors, and are interconnected by using technologies such as a bus. A person skilled in the art may understand that the terminal device may include a plurality of baseband processors to adapt to different network standards, the terminal device may include a plurality of central processing units to improve a processing capability of the terminal device, and the components of the terminal device may be connected by using various buses. The baseband processor may also be expressed as a baseband processing circuit or a baseband processing chip. The central processing unit may also be expressed as a central processing circuit or a central processing chip. A function of processing the communications protocol and the communications data may be built in the processor, or may be stored in the storage unit in a form of software program. The processor executes the software program to implement a baseband processing function.

For example, in the embodiments of this application, the antenna and the radio frequency circuit that have a transceiver function may be considered as a transceiver unit 1001 of the terminal device 1000, and the processor having a processing function may be considered as a processing unit 1002 of the terminal device 1000. As shown in FIG. 10, the terminal device 1000 includes the transceiver unit 1001 and the processing unit 1002. The transceiver unit may also be referred to as a transceiver, a transceiver machine, a transceiver apparatus, or the like. Optionally, a component that is in the transceiver unit 1001 and that is configured to implement a reception function may be considered as a receiving unit, and a component that is in the transceiver unit 1001 and that is configured to implement a sending function may be considered as a sending unit. In other words, the transceiver unit 1001 includes the receiving unit and the sending unit. For example, the receiving unit may also be referred to as a receiver, a receiver machine, a receive circuit, or the like, and the sending unit may be referred to as a transmitter, a transmitter machine, a transmit circuit, or the like. For example, in an embodiment, the transceiver unit 1001 may be configured to perform the method performed by the sending unit 801 and the receiving unit 802 shown in FIG. 8. For another example, the processing unit 1002 may be configured to perform the method performed by the synchronization unit 803 shown in FIG. 8.

It may be understood that for an implementation of the terminal device in this embodiment of this application, refer to the foregoing embodiments. Details are not described herein again.

Figure 11:
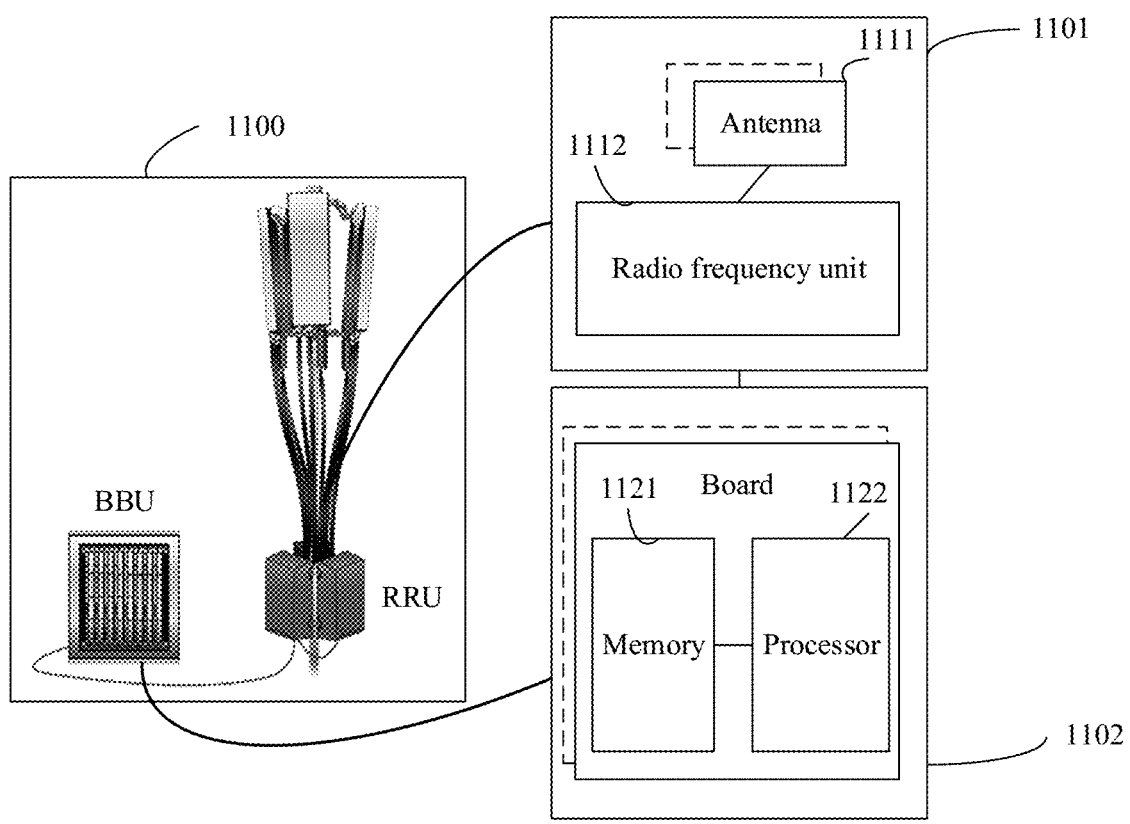
FIG. 11 is a schematic structural diagram of an access network device according to an embodiment of this application.

FIG. 11 is a schematic structural diagram of an access network device 1100 according to an embodiment of this application. The access network device may perform the operations of the access network device in the methods shown in FIG. 3 to FIG. 7, or the access network device may perform the operations of the communications apparatus shown in FIG. 9.

The access network device 1100 includes one or more remote radio units (RRU) 1101 and one or more baseband units (BBU) 1102. The RRU 1101 may be referred to as a transceiver unit, a transceiver machine, a transceiver circuit, a transceiver, or the like, and may include at least one antenna 1111 and a radio frequency unit 1112. The RRU 1101 is mainly configured to: receive and send radio frequency signals, and perform conversion between a radio frequency signal and a baseband signal, for example, configured to send the time information in the foregoing embodiments to a terminal device. The BBU 1102 is mainly configured to: perform baseband processing, control the access network device, and so on. The RRU 1101 and the BBU 1102 may be physically disposed together, or may be physically separated, that is, in a distributed access network device.

The BBU 1102 is a control center of the access network device, may also be referred to as a processing unit, and is mainly configured to complete a baseband processing function, such as channel coding, multiplexing, modulation, and spread spectrum.

In an example, the BBU 1102 may include one or more boards, and a plurality of boards may jointly support a radio access network (such as an LTE network) of a single access standard, or may separately support radio access networks of different access standards. The BBU 1102 further includes a memory 1121 and a processor 1122. The memory 1121 is configured to store a necessary message and necessary data. The memory 1121 and the processor 1122 may serve the one or more boards. In other words, a memory and a processor may be independently disposed on each board. Alternatively, a plurality of boards may share a same memory and processor. In addition, a necessary circuit is further disposed on each board. Optionally, the processor may be a CPU, an NP, or a combination of a CPU and an NP. The processor may further include a hardware chip. The hardware chip may be an ASIC, a PLD, or a combination thereof. The PLD may be a CPLD, an FPGA, a GAL, or any combination thereof. The memory may include a volatile memory, such as a RAM. Alternatively, the memory may include a nonvolatile memory, such as a flash memory, a hard disk, or a solid state drive. Alternatively, the memory may include a combination of the foregoing types of memories.

It may be understood that, during an implementation, the access network device may further have another structure. For example, the access network device may further be divided into a centralized unit (CU), a distributed unit (DU), and the like. Therefore, a structure of the access network device shown in FIG. 11 should not be construed as a limitation on the embodiments of this application.

A person of ordinary skill in the art may be aware that, examples of units and algorithm steps described with reference to the embodiments disclosed in this application may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that such an implementation goes beyond the scope of this application.

A person skilled in the art may clearly understand that for the purpose of convenient and brief description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, the apparatus embodiments described above are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position or distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

All or a part of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedures or functions according to the embodiments of this application are completely or partially generated. The computer may be a general-purpose computer, a dedicated computer, a computer network, or other programmable apparatuses. The computer instructions may be stored in a computer-readable storage medium or may be transmitted by using the computer-readable storage medium. For example, the computer instructions may be transmitted from one website, computer, server, or data center to another website, computer, server, or data center in a wired (such as coaxial cable, optical fiber, or digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

A person of ordinary skill in the art may understand that all or a part of the procedures of the methods in the embodiments may be implemented by a computer program instructing relevant hardware. The program may be stored in a computer-readable storage medium. When the program runs, the procedures of the methods in the embodiments are performed. The foregoing storage medium includes any medium that can store program code, such as a read-only memory (ROM), a random access memory (RAM), a magnetic disk, or an optical disc.

What is claimed is:

1. A terminal device, comprising:
   a processor; and
   a memory coupled to the processor, wherein the memory stores instructions that, when executed by the processor, causes the terminal device to perform operations comprising:
   sending a first indication message, wherein the first indication message is used to trigger an access network device to send time information to the terminal device in unicast mode, the first indication message comprises at least two time types supported by the terminal device and priority information of the at least two time types to enable the access network device to determine a target time type based on a priority of the at least two time types;
   receiving the time information including the target time type from the access network device;
   synchronizing a time of the terminal device based on the time information;
   sending a third indication message to the access network device, wherein the third indication message is used to indicate to deactivate the access network device to send the time information to the terminal device; and
   wherein the at least two time types are clock sources.

2. The terminal device according to claim 1, wherein the time information comprises a target time.

3. The terminal device according to claim 1, wherein the first indication message indicates a precision supported by the terminal device.

4. A communications apparatus, comprising:
   a processor; and
   a memory coupled to the processor, wherein the memory stores instructions that, when executed by the processor, causes the communications apparatus to perform operations comprising:
   receiving a first indication message, wherein the first indication message is used to trigger an access network device to send time information to a terminal device in unicast mode, the first indication message comprises at least two time types supported by the terminal device and priority information of the at least two time types to enable the access network device to determine a target time type based on a priority of the at least two time types;
   sending the time information including the target time type to the terminal device, wherein the time information is used for synchronizing a time of the terminal device;
   receiving a third indication message from the terminal device, wherein the third indication message is used to indicate to deactivate the access network device to send the time information to the terminal device; and
   wherein the at least two time types are clock sources.

5. The apparatus according to claim 4, wherein the time information comprises a target time.

6. The apparatus according to claim 4, wherein the first indication message indicates a precision supported by the terminal device.

7. A communication method, comprising:
   receiving, by an access network device from a terminal device, a first indication message, wherein the first indication message is used to trigger the access network device to send time information to the terminal device in unicast mode, the first indication message comprises at least two time types supported by the terminal device and priority information of the at least two time types to enable the access network device to determine a target time type based on a priority of the at least two time types;
   sending, by the access network device, the time information including the target time type to the terminal device;
   synchronizing, by the terminal device, a time of the terminal device based on the time information;
   sending, by the terminal device, a third indication message to the access network device, wherein the third indication message is used to indicate to deactivate the access network device to send the time information to the terminal device; and
   wherein the at least two time types are clock sources.

8. The method according to claim 7, wherein the time information comprises a target time.

9. The method according to claim 7, wherein the first indication message indicates a precision supported by the terminal device.

10. A communication system comprising: a terminal device and an access network device, wherein
    the terminal device comprises;
    a processor; and
    a memory coupled to the processor of the terminal device, wherein the memory of the terminal device stores instructions that, when executed by the processor of the terminal device, causes the terminal device to perform operations comprising:

sending a first indication message, wherein the first indication message is used to trigger the access network device to send time information to the terminal device in unicast mode, the first indication message comprises at least two time types supported by the terminal device and priority information of the at least two time types to enable the access network device to determine a target time type based on a priority of the at least two time types;

receiving the time information including the target time type from the access network device;

synchronizing a time of the terminal device based on the time information;

sending a third indication message to the access network device, wherein the third indication message is used to indicate to deactivate the access network device to send the time information to the terminal device; and the access network device comprises:

a processor; and a memory coupled to the processor of the access network device, wherein the memory of the access network device stores instructions that, when executed by the processor of the access network device, causes the access network device to perform operations comprising:

receiving the first indication message from the terminal device;

sending the time information to the terminal device, wherein the time information is used for synchronizing the time of the terminal device;

receiving the third indication message from the terminal device; and wherein the at least two time types are clock sources.

11. The communication system according to claim 10, wherein the time information comprises a target time.

12. The communication system according to claim 10, wherein the first indication message indicates a precision supported by the terminal device.

* * * * *